US012652078B2

(12) United States Patent
Bengtsson et al.

(10) Patent No.: US 12,652,078 B2
(45) Date of Patent: Jun. 9, 2026

(54) COMMUNICATION OVER A DUALLY-POLARIZED RE-CONFIGURABLE RELAYING DEVICE

(71) Applicant: Sony Group Corporation, Tokyo (JP)

(72) Inventors: Erik Bengtsson, Eslöv (SE); Fredrik Rusek, Eslöv (SE); Kun Zhao, Malmö (SE); Jose Flordelis, Lund (SE); Olof Zander, Södra Sandby (SE)

(73) Assignee: Sony Group Corporation, Tokyo (JP)

( * ) Notice: Subject to any disclaimer, the term of this patent is extended or adjusted under 35 U.S.C. 154(b) by 714 days.

(21) Appl. No.: 18/024,633

(22) PCT Filed: Sep. 14, 2021

(86) PCT No.: PCT/EP2021/075226
§ 371 (c)(1),
(2) Date: Mar. 3, 2023

(87) PCT Pub. No.: WO2022/058306
PCT Pub. Date: Mar. 24, 2022

(65) Prior Publication Data
US 2023/0327713 A1      Oct. 12, 2023

(30) Foreign Application Priority Data
Sep. 17, 2020      (SE) .................................... 2030290-7

(51) Int. Cl.
| | |
|---|---|
| *H04B 7/10* | (2017.01) |
| *H04B 7/04* | (2017.01) |
| *H04L 25/02* | (2006.01) |

(52) U.S. Cl.
CPC ........... *H04B 7/04013* (2023.05); *H04B 7/10* (2013.01); *H04L 25/0242* (2013.01)

(58) Field of Classification Search
CPC .... H04B 7/04013; H04B 7/10; H04B 7/0617; H04B 7/15528; H04B 7/15592;
(Continued)

(56) References Cited

U.S. PATENT DOCUMENTS

| | | | |
|---|---|---|---|
| 11,171,697 B2 * | 11/2021 | Fodor | ............... H04L 25/03955 |
| 2008/0159200 A1 | 7/2008 | Lee | |

(Continued)

FOREIGN PATENT DOCUMENTS

| | | |
|---|---|---|
| WO | 2010006645 A1 | 1/2010 |
| WO | 2013017175 A1 | 2/2013 |
| WO | 2015169368 A1 | 11/2015 |

OTHER PUBLICATIONS

International Search Report and Written Opinion from corresponding International Application No. PCT/EP2021/075226, mailed on Jan. 10, 2022, 15 pages.
(Continued)

*Primary Examiner* — Andrew Wendell
(74) *Attorney, Agent, or Firm* — Tucker Ellis LLP

(57) ABSTRACT

Examples provide a method of operating a first communication node (CN), wherein the first CN is configured for controlling a re-configurable relaying device (RRD), the RRD being re-configurable to provide spatial polarization filtering, the spatial polarization filtering being associated with an input spatial direction from which incident signals on a radio channel are accepted and with an output spatial direction into which the incident signals are transmitted by the RRD with configurable output polarizations set by the spatial polarization filtering, the method comprising providing, to the RRD, a control message indicative of predefined measurement spatial polarization filters; providing, to a second CN, a message requesting the second CN to transmit first reference signals associated with the predefined measurement spatial polarization filters, and receiving, on the
(Continued)

radio channel from the second CN, first reference signals associated with the predefined measurement spatial polarization filters indicated by said control message, for estimation of channel matrices. Further, examples provide a method of operating a second CN and an RRD as well as corresponding first CNs, second CNs and RRDs.

20 Claims, 6 Drawing Sheets

(58) Field of Classification Search
CPC . H04B 7/0697; H04L 25/0242; H04L 5/0048; H04L 5/250202
See application file for complete search history.

(56) References Cited

U.S. PATENT DOCUMENTS

| | | | |
|---|---|---|---|
| 2010/0001918 A1 | 1/2010 | Svensson et al. | |
| 2010/0135177 A1 | 6/2010 | Liu et al. | |
| 2015/0078257 A1* | 3/2015 | Wu | H04L 5/0048 |
| | | | 370/328 |
| 2020/0221384 A1 | 7/2020 | Ang et al. | |
| 2020/0280127 A1* | 9/2020 | Hormis | H04B 7/10 |
| 2020/0367257 A1* | 11/2020 | Hormis | H04B 7/155 |
| 2021/0013619 A1* | 1/2021 | Alkhateeb | H04B 7/04013 |
| 2021/0234592 A1* | 7/2021 | Ashrafi | H01Q 21/065 |
| 2024/0171221 A1* | 5/2024 | Bengtsson | H01Q 1/246 |

OTHER PUBLICATIONS

Office Action and Search Report from corresponding Swedish Application No. 2030290-7, mailed on May 28, 2021, 8 pages.

Beixiong Zheng et al., "Intelligent Reflecting Surface-Enhanced OFDM: Channel Estimation and Reflection Optimization", IEEE Wireless Communication Letters, vol. 9, No. 4, Apr. 2020, 6 pages.

Emil Bjornson et al., "Reconfigurable Intelligent Surfaces: Three Myths and Two Critical Questions", Jun. 5, 2020, 7 pages.

Huanhuan Yang et al., "A programmable metasurface with dynamic polarization, scattering and focusing control", Scientific Reports, vol. 6:35692, Oct. 24, 2016, 11 pages.

Linglong Dai et al., "Reconfigurable Intelligent Surface-Based Wireless Communications: Antenna Design, Prototyping, and Experimental Results", IEEE Access, vol. 8:45913, Mar. 16, 2020, 11 pages.

Ohyun Jo et al., "Exploitation of Dual-Polarization Diversity for 5G Millimeter-Wave MIMO Beamforming Systems", IEEE Transactions on Antennas and Propagation, vol. 65, No. 12, Dec. 12, 2017, 10 pages.

Simone Montori et al., "Reconfigurable and Dual-Polarization Folded Reflectarray Antenna", 2012 42nd European Microwave Conference, pp. 735-738, Oct. 29-Nov. 1, 2012.

Sean Victor Hum et al., "Reconfigurable Reflectarrays and Array Lenses for Dynamic Antenna Beam Control: A Review", IEEE Transactions on Antennas and Propagation, vol. 62, No. 1, Jan. 1, 2014, 16 pages.

* cited by examiner

COMMUNICATION OVER A DUALLY-POLARIZED RE-CONFIGURABLE RELAYING DEVICE

TECHNICAL FIELD

Examples relate to communication between communication nodes using re-configurable relaying devices, in particular re-configurable reflective devices.

BACKGROUND

In order to increase a coverage area for wireless communication, it is envisioned to use re-configurable relaying devices (RRD), in particular re-configurable reflective devices. Re-configurable reflective devices are sometimes also referred to as reflecting large intelligent surfaces (LIS). See, e.g., Sha Hu, Fredrik Rusek, and Ove Edfors. "Beyond massive MIMO: The potential of data transmission with large intelligent surfaces." IEEE Transactions on Signal Processing 66.10 (2018): 2746-2758.

An RRD can be implemented by an array of antennas that can reflect incident electromagnetic waves/signals. The array of antennas can be semi-passive. Semi-passive can correspond to a scenario in which the antennas do not provide signal amplification, but can impose a variable phase shift to the incident electromagnetic waves. An input spatial direction from which incident signals on a radio channel are accepted and an output spatial direction into which the incident signals are reflected can be re-configured, by changing a phase relationship between the antennas. Radio channel may refer to a radio channel specified by the 3GPP standard. In particular, radio channel may refer to a physical radio channel. The radio channel may offer several time/frequency-resources for communication between different communication nodes of a communication system.

Communication nodes may use dually polarized signals for data transmission. Dually polarized may imply that two orthogonal polarizations may be used for transmitting/receiving signals. Using polarization may offer a further degree of freedom in addition to time and frequency for transmitting/receiving signals. However, the rate of a specific link between to communication nodes may depend on the polarization actually used. When using an RRD there may be two independent links to be aware of, the link from a communication node transmitting a signal to the RRD and the link from the RRD to a communication node receiving the signal. It is not a straightforward task to determine how the RRD shall be optimally configured with a minimal amount of signalling.

SUMMARY

Accordingly, there may be a need of improved techniques for communication between communication nodes, CN, using dually polarized signals in combination with an RRD.

Said need is addressed with the subject-matter of the independent claims. The dependent claims define advantageous examples.

Examples provide a method of operating a first communication node (CN), wherein the first CN is configured for controlling a re-configurable relaying device (RRD), the RRD being re-configurable to provide spatial polarization filtering, the spatial polarization filtering being associated with an input spatial direction from which incident signals on a radio channel are accepted and with an output spatial direction into which the incident signals are transmitted by the RRD with configurable output polarizations set by the spatial polarization filtering, the method comprising providing, to the RRD, a control message indicative of predefined measurement spatial polarization filters; providing, to a second CN, a message requesting the second CN to transmit first reference signals associated with the predefined measurement spatial polarization filters, and receiving, on the radio channel from the second CN, first reference signals associated with the predefined measurement spatial polarization filters indicated by said control message, for estimation of channel matrices.

Further examples provide a method of operating a first communication node (CN), wherein the first CN is configured for controlling a re-configurable relaying device (RRD), the RRD being re-configurable to provide spatial polarization filtering, the spatial polarization filtering being associated with an input spatial direction from which incident signals on a radio channel are accepted and with an output spatial direction into which the incident signals are transmitted, in particular reflected, by the RRD with configurable output polarizations set by the spatial polarization filtering, the method comprising providing, to the RRD, a polarization measurement control message indicative of measurement spatial polarization filters; providing, to a second CN, a reference signal measurement request message requesting the second CN to receive second reference signals for estimation of channel matrices; transmitting, on the radio channel to the second CN, second reference signals associated with the predefined measurement spatial polarization filters; and obtaining, from the second CN, a measurement report indicative of a receive property of the second reference signals.

Additional examples provide a method of operating a second communication node (CN) the method comprising obtaining, from a first CN, a message indicative of the capability of the first CN to control a re-configurable relaying device (RRD), the RRD being re-configurable to provide spatial polarization filtering, the spatial polarization filtering being associated with an input spatial direction from which incident signals with input polarizations on a radio channel are accepted and with an output spatial direction into which the incident signals are transmitted by the RRD with configurable output polarizations set by the spatial polarization filtering, obtaining, from the first CN, a message requesting the second CN to transmit first reference signals for estimation of channel matrices, and transmitting, on the radio channel to the first CN, the first reference signals.

Still further examples provide a method of operating a second communication node (CN) the method comprising obtaining, from a first CN, a message indicative of the capability of the first CN to control a re-configurable relaying device (RRD), the RRD being re-configurable to provide spatial polarization filtering, the spatial polarization filtering being associated with an input spatial direction from which incident signals with input polarizations on a radio channel are accepted and with an output spatial direction into which the incident signals are transmitted, in particular reflected, by the RRD with configurable output polarizations set by the spatial polarization filtering, obtaining, from the first CN, a reference signal measurement request message requesting the second CN to receive second reference signals for estimation of channel matrices; receiving, on a radio channel from the first CN, second reference signals, and providing, to the first CN, a measurement report indicative of a receive property of the second reference signals.

Additional examples provide a first communication node (CN), wherein a control circuitry of the first CN is configured for causing the first CN to perform any of the aforementioned methods.

Further examples provide a second communication node (CN), wherein a control circuitry of the second CN is configured for causing the second CN to perform any of the aforementioned methods.

It is to be understood that the features mentioned above and those yet to be explained below may be used not only in the respective combinations indicated, but also in other combinations or in isolation without departing from the scope of the invention.

DETAILED DESCRIPTION

Figure 1:
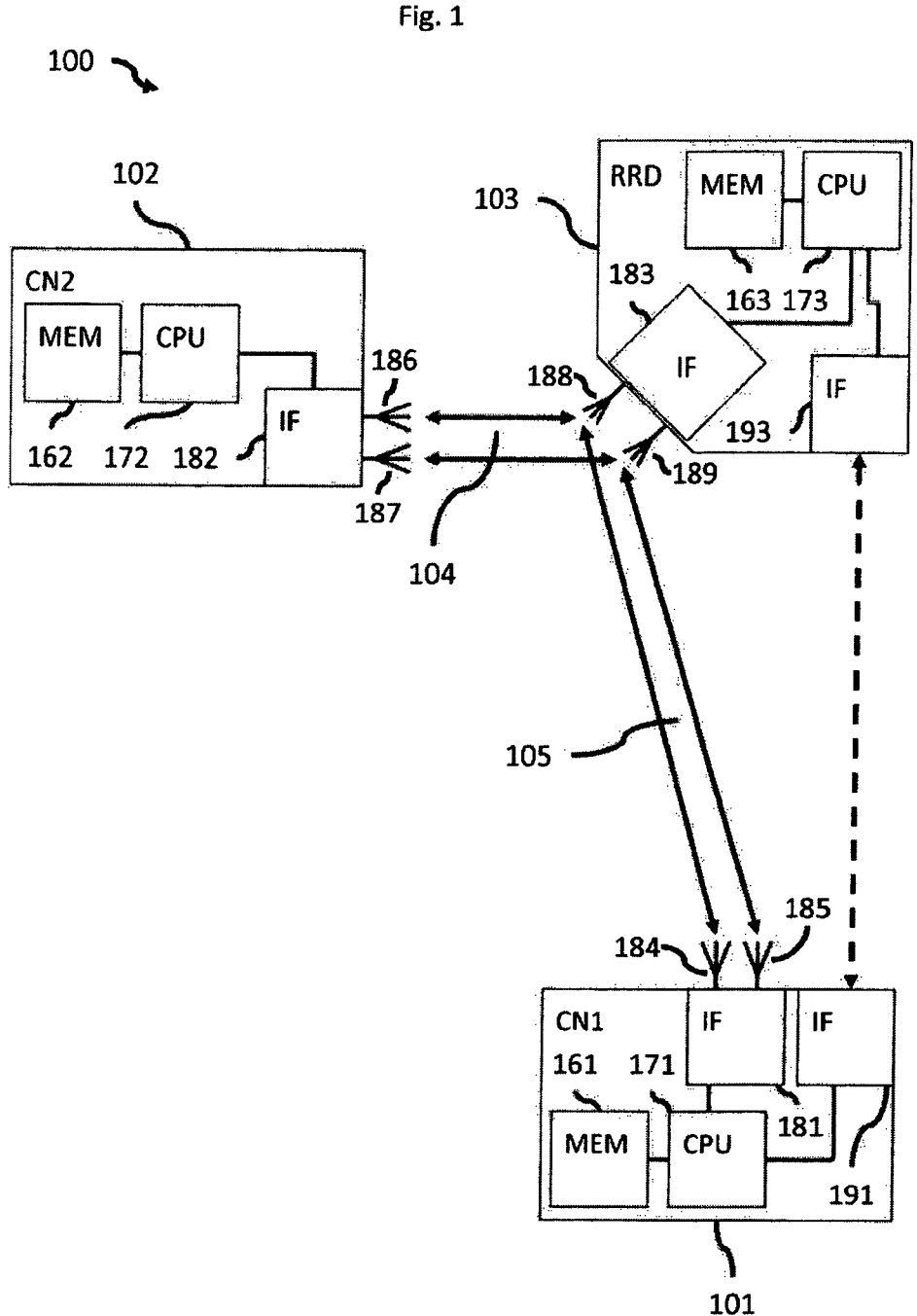
FIG. 1 schematically illustrates a communication system.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Techniques are described that facilitate wireless communication between communication nodes. In some examples, the wireless communication system can be implemented by a wireless communication network, e.g., a radio-access network (RAN) of a Third Generation Partnership Project (3GPP)-specified cellular network (NW). In such case, one communication node can be implemented by a base station (BS) of the RAN, and one or more further communication nodes can be implemented by terminals (also referred to as user equipment, UE).

According to examples, a first communication node, CN, can communicate with at least a second CN via an RRD.

The RRD may include an antenna array. The RRD may include a meta-material surface. In examples, an RRD may include a reflective antenna array (RAA).

There are many schools-of-thought for how RRDs should be integrated into 3GPP-standardized RANs.

In an exemplary case, the NW operator has deployed the RRDs and is therefore in full control of the RRD operations. The UEs, on the other hand, may not be aware of the presence of any RRD, at least initially, i.e., it is transparent to a UE whether it communicates directly with the BS or via an RRD. The RRD essentially functions as a coverage-extender of the BS. The BS may have established a control link with the RRD.

According to another exemplary case, it might be a private user or some public entity that deploys the RRD. Further, it may be that the UE, in this case, controls RRD operations. The BS, on the other hand, may not be aware of the presence of any RRD and, moreover, may not have control over it/them whatsoever. The UE may gain awareness of the presence of RRD by means of some short-range radio technology, such as Bluetooth, wherein Bluetooth may refer to a standard according to IEEE 802.15, or WiFi, wherein WiFi may refer to a standard according to IEEE 802.11, by virtue of which it may establish the control link with the RRD.

In the following it may be assumed that the first CN is configured for controlling the RRD. In some examples, the first CN may thus correspond to the BS and in other examples the first CN may correspond to the UE.

FIG. 1 schematically illustrates a communication system 100. The communication system 100 includes a first communication node 101 and a second communication node 102. The first CN 101 and the second CN 102 are configured to communicate with each other via a radio channel 104, 105. In the example of FIG. 1, the second CN 102 may be implemented by an access node (AN), more specifically a BS, and the first CN 101 may be implemented by a UE. The BS 120 can be part of a cellular NW (not shown in FIG. 1).

As a general rule, the techniques described herein could be used for various types of communication systems, e.g., also for peer-to-peer communication, etc. For sake of simplicity, however, hereinafter, various techniques will be described in the context of a communication system that is implemented by a BS 120 of a cellular NW and a UE 110.

As illustrated in FIG. 1, there can be DL communication from the second CN 102 via the RRD 103 to the first CN 101, as well as UL communication from the first CN 101 via the RRD 103 to the second CN 102. Examples described herein particularly focus on the DL communication, but similar techniques may be applied to UL communication.

The first CN 101 may include control circuitry 171, memory circuitry 161, in particular non-volatile memory, 161, and interface circuitry 181. The interface circuitry 181 may be adapted for controlling transmission/reception of signals having a first polarization on a radio channel 105 via a first antenna group 184 comprising one or more antennas and signals having a second polarization on the radio channel 105 via second antenna group 185. The first polarization may be different from the second polarization. In particular, the first polarization may be orthogonal to the second polarization. In examples, the first polarization may be a horizontal polarization and the second polarization may be a vertical polarization. In other examples, the first polarization may be a right-handed circular polarization and the second polarization may be a left-handed circular polarization. It is also conceivable that the first polarization is a right-handed elliptical polarization and the second polarization is a left-handed elliptical polarization. The control circuitry 171 may be implemented by a processor 171. The processor 171 may be configured to load program code that is stored in the memory 161. The processor 171 may then execute the program code. Executing the program code may cause the processor to perform techniques as described herein. Due to its capability to transmit signals using a first and a second polarization, the second CN 101 may also be considered as dually polarized CN. The first CN 101 may further comprise interface circuitry 191 for controlling the RRD 103 wirelessly. The wireless control of the RRD 103 may particularly be implemented with a short-range radio technology such as Bluetooth or WiFi.

Similarly, the second CN 102 may include control circuitry 172, memory circuitry 162, in particular non-volatile memory, 162, and interface circuitry 182. The interface circuitry 182 may be adapted for controlling transmission/reception of signals having a third polarization on a radio channel 104 via a first antenna group 186 comprising one or more antennas and signals having a fourth polarization on the radio channel 104 via second antenna group 187. The third polarization may be different from the fourth polarization. In particular, the third polarization may be orthogonal to the fourth polarization. In examples, the third polarization may be a horizontal polarization and the fourth polarization may be a vertical polarization. In other examples, the third polarization may be a right-handed circular polarization and the fourth polarization may be a left-handed circular polarization. It is also conceivable that the third polarization and the fourth polarization are orthogonal elliptical polarizations. The control circuitry 172 may be implemented by a processor 172. The processor 172 may be configured to load program code that is stored in the memory 162. The processor 172 may then execute the program code. Executing the program code may cause the processor to perform techniques as described herein. Due to its capability to transmit signals using a third and a fourth polarization, the second CN 102 may also be considered as dually polarized CN.

The RRD 103 may include control circuitry 173, memory circuitry 163, in particular non-volatile memory, 163, and interface circuitry 183. The interface circuitry 183 may be adapted for controlling accepting/transmitting of signals having a fifth polarization via a first antenna group 188 comprising one or more antennas and signals having a sixth polarization on the radio channel 104, 105 via second antenna group 189. The fifth polarization may be different from the sixth polarization. In particular, the fifth polarization may be orthogonal to the sixth polarization. The polarizations may be linear, circular or elliptical polarizations. The control circuitry 173 may be implemented by a processor 173. The processor 173 may be configured to load program code that is stored in the memory 163. The processor 173 may then execute the program code. Executing the program code may cause the processor to perform techniques as described herein. The RRD 103 may further comprise interface circuitry 183 for being controlled by the first CN 101.

While the scenario of FIG. 1 illustrates the antenna groups 184, 185, 186, 187 being coupled to the first CN 101 and the second CN 102, respectively, as a general rule, it would be possible to employ transmit-receive points (TRPs) that are spaced apart from the first CN 101 and/or the second CN 102.

The interfaces 181, 182 may each include one or more transmitter (TX) chains and one or more receiver (RX) chains. For instance, such RX chains can include low noise amplifiers, analogue to digital converters, mixers, etc. Analogue and/or digital beamforming would be possible. Thereby, phase-coherent transmitting and/or receiving (communicating) can be implemented across the multiple antennas 184, 185, 186, 187. Thereby, the first CN 101 and the second CN 102 may selectively transmit on multiple TX beams (beamforming), to thereby direct energy into distinct spatial directions.

By using a TX beam, the direction of the wavefront of signals transmitted by a transmitter of the communication system is controlled. Energy is focused into a respective direction or even multiple directions, by phase-coherent superposition of the individual signals originating from each antenna group 184, 185, 186, 187. Thereby, the spatial data stream can be directed. The spatial data streams transmitted on multiple beams can be independent, resulting in spatial multiplexing multi-antenna transmission; or dependent on each other, e.g., redundant, resulting in diversity transmission or diversity multi-input multi-output transmission. As a general rule, alternatively or additionally to such TX beams, it is possible to employ receive (RX) beams.

The RRD 103 may include a phased array of antennas that impose a configurable phase shift when reflecting incident signals. This defines respective spatial filters that are associated with spatial directions into which the incident signals are reflected. The antennas can be passive or semi-passive elements that do not provide any amplification. The RRD 103 thus provides coverage extension by reflection of radio-frequency (RF) signals. A translation to the baseband may not be required. This is different, to, e.g., decode-and-forward repeater or relay functionality. This is only one example implementation of the RRD. Other implementations are conceivable. For example, a meta-material surface not including distinct antenna elements may be used. The meta-material can have a configurable refraction index. To provide a re-configurable refractive index, the meta-material may be made of repetitive tunable structures, in particular periodic tunable structures, that have extensions smaller than the wavelength of the incident RF signals.

In an exemplary scenario, the second CN 102 (for example, a base station or gNB as specified by 3GPP) may transmit a signal and the RRD 103 may reflect the incoming signal towards the first CN 101 (for example, a wireless communication device or UE). For dually polarized CNs, polarization properties of the link from the second CN 102 to the RRD 103 can be mathematically modeled with a 2×2 complex valued matrix $H_1$, and the polarization properties of the link from the RRD 103 to the first CN 101 can be modeled with another 2×2 complex valued matrix $H_2$. Thus, the overall link from the second CN 102 to the first CN 101 can be modeled as $H_2 H_1$.

However, the interplay between $H_2$ and $H_1$ may be such that the product $H_2H_1$ leads to weak capacity. E.g. if $H_1$ supports only horizontal polarized signals $$(e.g., H_1 = \begin{bmatrix} \sqrt{2} & 0 \\ 0 & 0 \end{bmatrix})$$

while $H_2$ $$(e.g., H_2 = \begin{bmatrix} 0 & 0 \\ 0 & \sqrt{2} \end{bmatrix})$$

favors vertical polarized signals, the product $$(e.g., H = H_2H_1 = \begin{bmatrix} \sqrt{2} & 0 \\ 0 & 0 \end{bmatrix}\begin{bmatrix} 0 & 0 \\ 0 & \sqrt{2} \end{bmatrix} = \begin{bmatrix} 0 & 0 \\ 0 & 0 \end{bmatrix})$$

would be zero.

A polarization matching mechanism at the RRD 103 may be used to improve the overall link from the second CN 102 to the first CN 101.

Mathematically, the polarization matching mechanism at the RRD 103 may be modelled by another 2×2 complex valued matrix Q that is subject to some constraints which will be discussed further below. The matrix Q may also be considered as a spatial polarization filter, or a spatial polarization matching filter. The spatial polarization filter may not only adapt the polarization of the signals but also the direction to take account for the different (and possibly changing) input/output directions of the signals to/from the CNs.

Accordingly, the mathematical model for the overall link from the second CN 102 to the first CN 101 then becomes $H_2QH_1$.

Typically, the matrices $H_1$ and $H_2$ are not directly observable but only their product $H_2H_1$ (or the product $$H_1^T H_2^T$$

corresponding to the link from the first CN 101 to the second CN 102 in case of beam reciprocity). Even if the product $H_2H_1$ is perfectly known, there are still many possible values for $H_2$ and $H_1$. Thus, it may be challenging to determine a matrix Q so that the overall matrix $H_2QH_1$ has better capacity, signal-to-noise ratio (SNR), signal-to-interference-plus-noise ratio (SINR) or reference signals received power (RSRP).

The matrix representation $H_2H_1$ assumes that the RRD 103 reflects the signals from the second CN with the two incoming polarizations individually. The two incoming (orthogonal) polarizations may be vertical and horizontal polarizations or left-handed and right-handed circular polarizations or more generally left-handed and right-handed elliptical polarizations. For simplification purposes, reference will be made to vertical and horizontal polarizations in the following, but corresponding reasoning applies for other types of two orthogonal polarizations.

In the example of vertical and horizontal polarizations, a signal with incoming horizontal polarization may be reflected with a horizontal polarization without any phase change, and an incoming signal with vertical polarization may be reflected with vertical polarization without any phase change. For the model $H=H_2H_1$, this implies that H may be considered as $H=H_2QH_1$, where Q=I.

As explained hereinbefore, the RRD 103 may provide spatial polarization filtering. Thus, predefined measurement spatial polarization filters may be applied by the RRD 103 to incident signals. Using predetermined reference signals in combination with predefined spatial polarization filters may allow for estimating $H_1$ and $H_2$ by observing $H=H_2QH_1$. Such predefined spatial polarization filters for estimating $H_1$ and $H_2$ may also be referred to as measurement spatial polarization filters herein.

N measurements may be used for estimating $H_1$ and $H_2$. The second CN 102 may transmit N reference signals which may mathematically be represented by N 2×1 vectors $x_1$, $x_2$, . . . , $x_N$ via the RRD 103 to the first CN 101. To these reference signals, the RRD 103 may apply respective predefined measurement spatial polarization filters which may mathematically be represented by polarization matrices $Q_1$, $Q_2$, $Q_N$. Thus, as a basis for determining the optimal matrix Q, and in the absence of noise, the first CN 101 may have the following N signals at its disposal, $$y_n = H_2 Q_n H_1 x_n, \quad 1 \leq n \leq N.$$

In an example, $H_1$ and $H_2$ may be estimated, up to a complex scalar, which is referred to as $\beta$ here, using N=5 measurements. The complex scalar $\beta$ may refer to an absolute phase delay and gain for the respective link. The exact value of the complex scalar $\beta$ may be neglected in the context of optimizing Q. The following reference signals $$x_1 = \begin{bmatrix} 1 \\ 0 \end{bmatrix},$$

$$x_2 = \begin{bmatrix} 1 \\ 0 \end{bmatrix},$$

$$x_3 = \begin{bmatrix} 0 \\ 1 \end{bmatrix},$$

$$x_4 = \begin{bmatrix} 1 \\ 0 \end{bmatrix},$$

$$x_5 = \begin{bmatrix} 0 \\ 1 \end{bmatrix},$$

may be transmitted and the corresponding predefined measurement spatial polarization filters $$Q_1 = \begin{bmatrix} 1 & 0 \\ 0 & 0 \end{bmatrix},$$

$$Q_2 = \begin{bmatrix} 0 & 0 \\ 1 & 0 \end{bmatrix},$$

$$Q_3 = \begin{bmatrix} 1 & 0 \\ 0 & 0 \end{bmatrix},$$

$$Q_4 = \begin{bmatrix} 0 & 1 \\ 0 & 0 \end{bmatrix},$$

$$Q_5 = \begin{bmatrix} 0 & 1 \\ 0 & 0 \end{bmatrix}$$

may be applied for estimating $H_1$ and $H_2$.

Using the definitions $$H_1 = \begin{bmatrix} h_1 \\ h_2 \end{bmatrix},$$

-continued $$h_1 = [\, h_{11} \quad h_{12}\,],$$

$$h_2 = [\, h_{21} \quad h_{22}\,],$$

$$H_2 = [\, z_1 \quad z_2\,],$$

$$z_1 = \begin{bmatrix} z_{11} \\ z_{12} \end{bmatrix},$$

$$z_2 = \begin{bmatrix} z_{12} \\ z_{22} \end{bmatrix}.$$

the first CN 101 may measure $y_1 = z_1 h_{11} + n_1$ for estimating $\beta \hat{z}_1$ with $\beta = h_{11}$;

$y_2 = z_2 h_{11} + n_2$ for estimating $\beta \hat{z}_2$;

$y_3 = z_1 h_{12} + n_3$ for estimating $\beta^{-1} \widehat{h_{12}}$;

$y_4 = z_1 h_{21} + n_4$ for estimating $\beta^{-1} \widehat{h_{21}}$; and $y_5 = z_1 h_{22} + n_5$ for estimating $\beta^{-1} \widehat{h_{22}}$.

The terms $n_{n1}, \ldots, n_5$ cited above indicate noise.

Thus, N=5 measurements may be sufficient for estimating $\beta \widehat{H_2}$ and $\beta^{-1} \widehat{H_1}$ with $\beta = h_{11}$. This may be an optimal solution since $H_2 Q H_1 = (\beta H_2) Q (\beta^{-1} H_1)$ for any complex scalar $\beta \neq 0$. The estimated matrices $\beta \widehat{H_2}$ and $\beta^{-1} \widehat{H_1}$ may be used for optimizing Q.

In other examples, different numbers of measurements may be used. For example, N=8 measurements with the reference signals $$x_1 = \begin{bmatrix} 1 \\ 0 \end{bmatrix},$$

$$x_2 = \begin{bmatrix} 0 \\ 1 \end{bmatrix},$$

$$x_3 = \begin{bmatrix} 1 \\ 0 \end{bmatrix},$$

$$x_4 = \begin{bmatrix} 0 \\ 1 \end{bmatrix},$$

$$x_5 = \begin{bmatrix} 1 \\ 0 \end{bmatrix},$$

$$x_6 = \begin{bmatrix} 0 \\ 1 \end{bmatrix},$$

$$x_7 = \begin{bmatrix} 1 \\ 0 \end{bmatrix},$$

$$x_8 = \begin{bmatrix} 0 \\ 1 \end{bmatrix},$$

and predetermined measurement spatial polarization filters $$Q_1 = Q_2 = \begin{bmatrix} 1 & 0 \\ 0 & 0 \end{bmatrix},$$

$$Q_3 = Q_4 = \begin{bmatrix} 0 & 1 \\ 0 & 0 \end{bmatrix},$$

$$Q_5 = Q_6 = \begin{bmatrix} 0 & 0 \\ 1 & 0 \end{bmatrix},$$

$$Q_7 = Q_8 = \begin{bmatrix} 0 & 0 \\ 0 & 1 \end{bmatrix}$$

may be used.

For the purpose of selecting a matrix $$Q = \begin{bmatrix} q_{11} & q_{12} \\ q_{21} & q_{22} \end{bmatrix},$$

the following 4 observation matrices may be defined:

$$Y_1 = [y_1 y_2], \ Y_2 = [y_3 y_4], \ Y_3 = [y_5 y_6], \ Y_4 = [y_7 y_8].$$

Accordingly, $H_2\,QH_1$ may be expressed as follows:

$$H_2 Q H_1 = q_{11} Y_1 + q_{12} Y_2 + q_{21} Y_3 + q_{22} Y_4.$$

The quantity which is to be optimized is the Shannon capacity of the link from the second CN 102 to the first CN 101 via the RRD 103. This may be formulated as $$\max_{Q} \log_2 \det\left( I + \frac{H_2 Q H_1 H_1^H Q^H H_2^H}{N_0} \right).$$

Using the definitions presented above, said formula may be expressed as follows:

$$\max_{Q} \log_2 \det\left( I + \frac{H_2 Q H_1 H_1^H Q^H H_2^H}{N_0} \right) =$$

$$\max_{Q} \log_2 \det\left( I + \frac{(q_{11} Y_1 + q_{12} Y_2 + q_{21} Y_3 + q_{22} Y_4)(q_{11} Y_1 + q_{12} Y_2 + q_{21} Y_3 + q_{22} Y_4)^H}{N_0} \right).$$

This may be compactly written as $$\max_{Q} f(Q; Y),$$

where $$f(Q; Y) = \log_2 \det\left( I + \frac{(q_{11} Y_1 + q_{12} Y_2 + q_{21} Y_3 + q_{22} Y_4)(q_{11} Y_1 + q_{12} Y_2 + q_{21} Y_3 + q_{22} Y_4)^H}{N_0} \right).$$

Typically, this may be a convex optimization problem in Q. However, practical constraints on Q may render the optimization non-convex. The RRD 103 may lack power amplifiers, and therefore the elements in Q may be limited to complex phasors, or zeros.

The following cases A to F may be considered to take account for the practical constraints.

In case A, Q is either identity or the anti-identity. In this case, optimization is reduced to selecting Q from $$Q = \begin{bmatrix} 1 & 0 \\ 0 & 1 \end{bmatrix}$$

or $$Q = \begin{bmatrix} 0 & 1 \\ 1 & 0 \end{bmatrix}.$$

This can be related to the aforementioned example, in which $H_1$ and $H_2$ favor different polarizations (for example, $H_1$ favors a horizontal polarization and $H_2$ a vertical polarization). In such a case, the $$Q = \begin{bmatrix} 1 & 0 \\ 0 & 1 \end{bmatrix}$$

may simply move energy from one polarization to the other.

$$Q = \begin{bmatrix} 0 & 1 \\ 1 & 0 \end{bmatrix}$$

may be selected if $$H_1, H_2 = \beta \begin{bmatrix} 1 & 0 \\ 0 & 0 \end{bmatrix}$$

and $$Q = \begin{bmatrix} 0 & 1 \\ 1 & 0 \end{bmatrix}$$

may be selected if $$H_1 = \beta \begin{bmatrix} 1 & 0 \\ 0 & 0 \end{bmatrix},$$

$$H_2 = \beta \begin{bmatrix} 0 & 0 \\ 0 & 1 \end{bmatrix}.$$

In case B, Q is constrained to be diagonal. In this case, $$\max_Q f(Q; Y)$$

has to be solved under the constraints $|q_{11}|=|q_{22}|=1$ and $q_{12}=q_{21}=0$. This set of constraints may correspond to an RRD 103 that maintains polarization, e.g. reflects the incoming signal with vertical polarization to an outgoing signal with vertical polarization, and reflects the incoming signal with horizontal polarization to an outgoing signal with horizontal polarization. However, such an RRD 103 may still induce a phase delay for the respective signal.

In case C, Q is constrained to be anti-diagonal. In this case, we should solve $$\max_Q f(Q; Y)$$

under the constraints $|q_{12}|=|q_{12}|=1$, $q_{11}=q_{22}=0$ constraints may correspond to an RRD 103 configured to swap polarizations, e.g., the RRD 103 may be configured to reflect the incoming signal with vertical to an outgoing signal with horizontal polarization and reflects the incoming signal with horizontal polarization to an outgoing signal with vertical polarization. In addition, the RRD 103 may be configured to induce a phase delay for each polarization.

In case D, Q is constrained to be either diagonal or anti-diagonal. In this case, the optimization problem is solved for cases B and C first and after the better of the two solutions is applied. Said constrains may correspond to an RRD 103 being configured to either maintain polarization, or swap it. In addition, the RRD 103 may be configured in both cases to induce a phase delay for each polarization. Such an RRD 103 may be more complex to implement than an RRD 103 for cases A to C, but may allow for a higher Shannon capacity on the link from the second CN 102 to the first CN 101.

In case E, Q is an arbitrary unitary matrix. In this case, $$\max_Q f(Q; Y)$$

has to be solved under the constraint $QQ^H=I$. In microwave technology, passive, lossless networks may be modeled by unitary matrices Q. This more relaxed constraint is more challenging to implement at the RRD 103 than the aforementioned constraints according to cases A to C, since it may require circuitry that can combine different polarizations. However, case E may lead to superior performance.

In case F, Q is an arbitrary 2×2 matrix. An RRD 103 comprising active components may be required for such relaxed requirements on Q. In a subcase with a regular structure Q may be restricted to be of the form $$Q = \alpha \begin{bmatrix} e^{j\phi_{11}} & e^{j\phi_{12}} \\ e^{j\phi_{21}} & e^{j\phi_{22}} \end{bmatrix},$$

with α an scalar.

Examples considered hereon focus on the case of RRDs 103 with passive radio frequency (RF) components. However, it is clear that the principles and methods explained in this disclosure may also be applied using RRDs 103 including active RF components.

Figure 2:
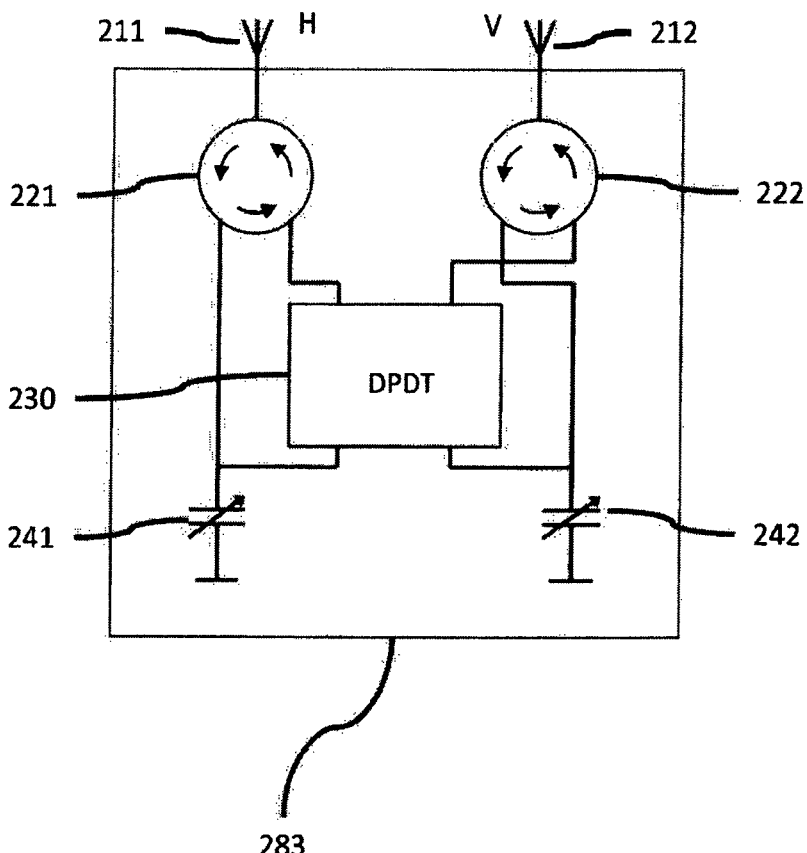
FIG. 2 schematically illustrates an interface of a re-configurable relaying device.

FIG. 2 illustrates circuitry 283 of an RRD 103 which may be used for polarization adjusting as explained hereinbefore. For simplifications purposes, FIG. 2 illustrates the circuitry for one dually polarized antenna element at the RRD 103 with a first antenna 211 associated with a first polarization, e.g. a horizontal polarization, and a second antenna 212 associated with a second polarization, e.g. a vertical polarization.

Further, the circuitry 283 may comprise circulators 221, 222 connected to the antennas 211, 212 and to phase shifters 241, 242, respectively. The phase shifters 241, 242, may be implemented as adjustable capacitors. Further, the circuitry 283 may comprise a switch 230. Moreover, the circulators 221, 22 may be connected to outputs of the switch 230. In a first state, the switch 230 may connect a first circulator 221 to a first phase shifter 241 and a second circulator 222 to a second phase shifter 242. This may correspond to a situation in which the reflected signals should have the same polarization as the incident signals. In a second state, the switch 230 may connect the first circulator 221 to the second phase shifter 242 and the second circulator 222 to the first phase shifter 241. This may correspond to a situation in which the reflected signals should have the inverted polarization than the incident signals, e.g., signals with a vertical polarization are reflected as signals with a horizontal polarization and signals with a horizontal polarization are reflected as signals with a vertical polarization. The switch 230 may be a dual-pole dual-throw (DPDT) switch. Typically, the RRD 103 will comprise a plurality of similar or same circuitry 283.

For cases A and D, the switch 230 allows for shifting one polarization to the other polarization. The phase shifts (i.e., the values in the Q matrix) may be accommodated for in the same phase shifters 241, 242 which already exist for beam forming. The effort for implementing said solution is low, since all antenna elements of the RRD 103 may be adjusted equally.

For cases B and C, the circuitry 283 may be simplified, because shifting one polarization to the other polarization is not required. Thus, the switch 230 may be omitted and replaced with fixed circuitry corresponding to the respective state of the switch 230.

For case E, the switch 230 may have to be replaced by a network of additional phase shifters and adders. The network may correspond to a physical implementation of a matrix multiplication with a matrix having constant magnitude entries. In this case, phase rotations cannot be accommodated for in the already existing phase shifters 241, 242.

Figure 3:
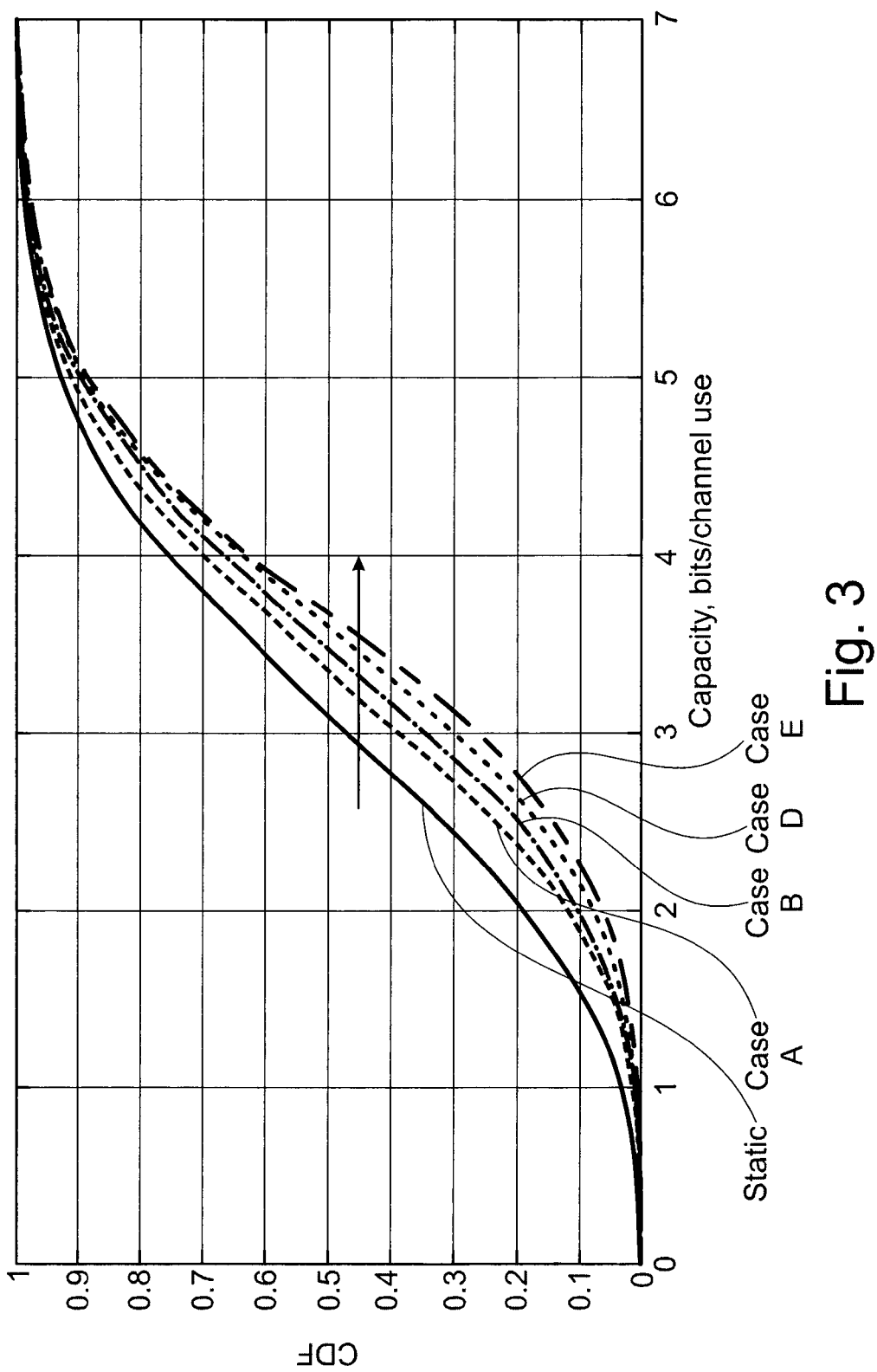
FIG. 3 illustrates capacity gains.

FIG. 3 illustrates possible capacity gains which may be obtained by performing polarization adjustment as explained hereinbefore based on numerical simulations. In FIG. 3, cumulative distribution functions (CDFs) for the capacity for five different cases are shown. In all cases, the channels $H_1$ and $H_2$ are randomly selected according to an independent and identically distributed (i.i.d) complex Gaussian distribution with unit variance per matrix entry. Additive white Gaussian noise (AWGN) is assumed with complex variance $N_0=1$.

The five curves in FIG. 3 relate to, from left to right, a static selection $$Q = \begin{bmatrix} 1 & 0 \\ 0 & 1 \end{bmatrix};$$

case A, a selection between $$Q = \begin{bmatrix} 1 & 0 \\ 0 & 1 \end{bmatrix} \text{ or } Q = \begin{bmatrix} 0 & 1 \\ 1 & 0 \end{bmatrix},$$

depending on what provides the highest capacity;

case B, a diagonal, but optimized Q subject to a unit modulus constraint ($\|Q\|=1$). From symmetry considerations it follows that case C leads to identical results;

case D, and case E with a unitary matrix Q.

As can be seen in the FIG. 3, hefty gains of up to about 25% on the average capacity may be possible by allowing for polarization adjustments.

A substantial gain of about 5% on the average capacity may already be achieved for case A which only prescribes selecting between $$Q = \begin{bmatrix} 1 & 0 \\ 0 & 1 \end{bmatrix} \text{ or } Q = \begin{bmatrix} 0 & 1 \\ 1 & 0 \end{bmatrix}$$

compared with the static choice $$Q = \begin{bmatrix} 1 & 0 \\ 0 & 1 \end{bmatrix}.$$

For case A, N=4 measurements may already be sufficient for optimizing Q. In particular, it may be possible to select the 4 reference signals $$x_1 = \begin{bmatrix} 1 \\ 0 \end{bmatrix}, x_2 = \begin{bmatrix} 0 \\ 1 \end{bmatrix}, x_3 = \begin{bmatrix} 1 \\ 0 \end{bmatrix}, x_4 = \begin{bmatrix} 0 \\ 1 \end{bmatrix},$$

and the corresponding predefined measurement spatial polarization filters $$Q_1 = Q_2 = \begin{bmatrix} 1 & 0 \\ 0 & 1 \end{bmatrix}, Q_3 = Q_4 = \begin{bmatrix} 0 & 1 \\ 1 & 0 \end{bmatrix}.$$

According to FIG. 3, case B (and for symmetry considerations case C) leads to better results concerning the average capacity of the link than case A. For case B, N=4 measurements may still be sufficient with the 4 reference signals $$x_1 = \begin{bmatrix} 1 \\ 0 \end{bmatrix}, x_2 = \begin{bmatrix} 0 \\ 1 \end{bmatrix}, x_3 = \begin{bmatrix} 1 \\ 0 \end{bmatrix}, x_4 = \begin{bmatrix} 0 \\ 1 \end{bmatrix},$$

and the corresponding predefined measurement spatial polarization filters $$Q_1 = Q_2 = \begin{bmatrix} 1 & 0 \\ 0 & 0 \end{bmatrix}, Q_3 = Q_4 = \begin{bmatrix} 0 & 0 \\ 1 & 0 \end{bmatrix}.$$

For case D, the Q matrices need to be changed, but as there are less degrees of freedom for selecting an optimized Q compared to the most general case E explained above, it may still be possible to use only N=4 for measurements for implementing the optimization according to case D.

Case B and C may only lead to slight improvements on the channel capacity compared to case A. For cases A to C, N=4 measurements may be sufficient as explained hereinbefore. Hence, cases A to C yield equal overhead.

Case A has the advantage that the first CN 101 may not need to feedback the Q matrix to the RRD 103. Instead, the second CN 102 may swap the polarization of the communication signals transmitted to the first CN 101.

Cases B and C may have the advantage that they may be implemented without modifying the circuitry of the RRD 103. In particular, the required phase shifts for cases B and C may be performed by the existing phase shifters used to form beams. The polarization swap may be performed by the second CN 102.

The channel capacity for Case D improves slightly compared to cases B and C, but may require an adaptation of the circuitry of the RRD 103 to allow for shifting the polarization. Further, case D may require N=5 measurements.

According to FIG. 3, case E leads to still slightly better results concerning channel capacity than case D. However, circuitry for case E may be substantially more complex to implement in hardware.

No matter which case A to E is considered, increasing the rate by choosing an appropriate spatial polarization filter, i.e., Q, may be performed by standard line-searches. In particular, it may be possible to try different predefined spatial polarization filters (e.g., Q) and choose the one which leads to the best rate without using dedicated reference signals. However, this may require substantially more than N=4 or N=5 measurements.

The techniques described herein are not limited to re-configurable reflective devices, which may also be called re-configurable reflective arrays. Instead, the proposed techniques may also be used for active relay nodes.

Implementing the techniques described herein may require signaling between the first CN 101, the second CN 102 and the RRD 103.

Figure 4:
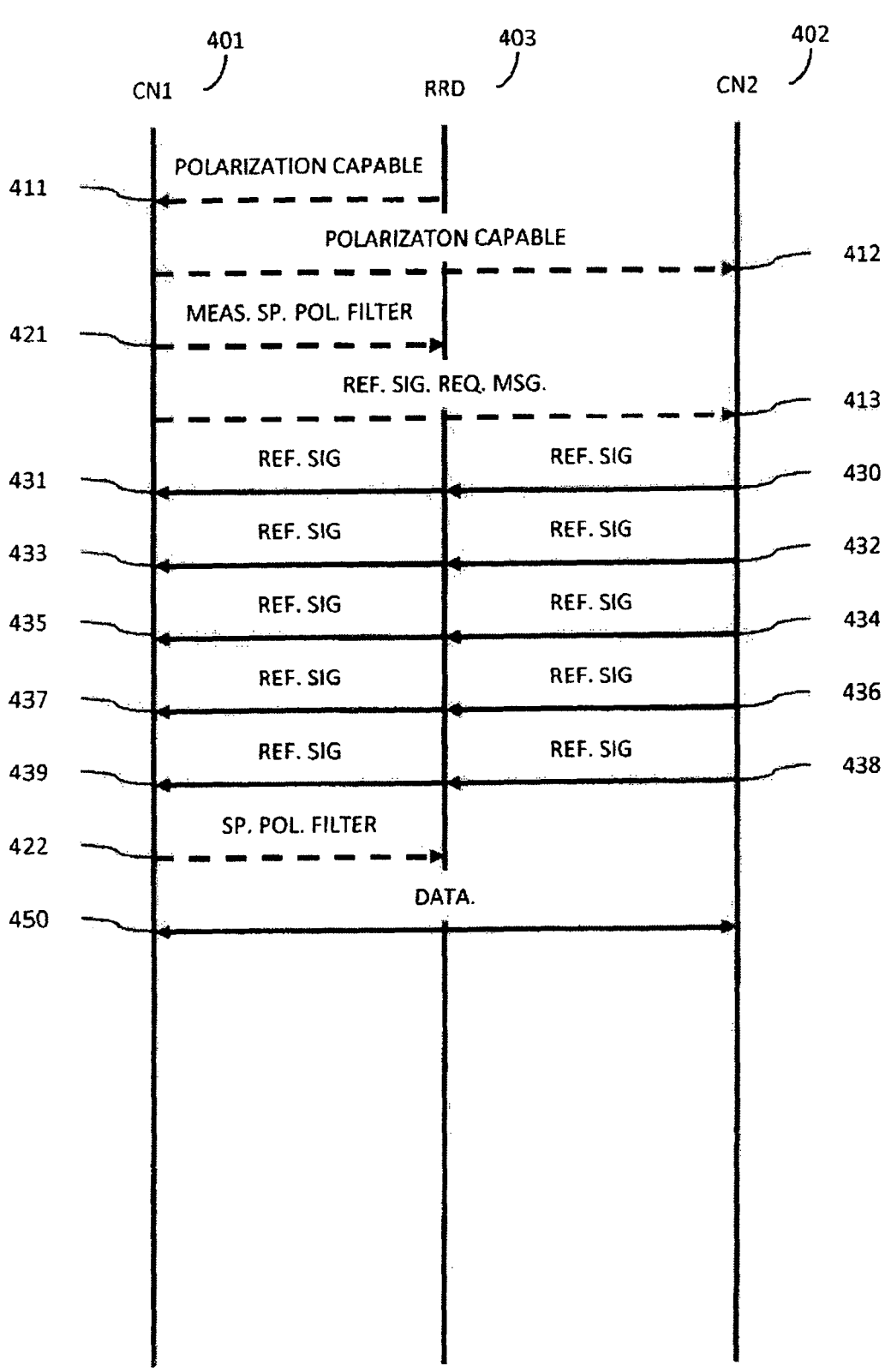
FIG. 4 is a signalling diagram.

FIG. 4 shows a signaling diagram illustrating signals exchanged between the first CN 401, the second CN 402 and the RRD 403.

The RRD 403 may be a re-configurable reflective device. The RRD 403 may be re-configurable to provide spatial polarization filtering, the spatial polarization filtering being associated with an input spatial direction from which incident signals on a radio channel are accepted and with an output spatial direction into which the incident signals are transmitted, in particular reflected, by the RRD with configurable output polarizations set by the spatial polarization filtering.

The RRD 403 may provide, to a first CN 401, a message 411 indicative of the RRD being re-configurable to provide multiple spatial polarization filters. The message 411 is not necessarily transmitted on the radio channel on which signals are accepted and transmitted, in particular reflected, by the RRD 403. Instead, the message 411 may be transmitted on a different radio channel, for example a radio channel associated with Bluetooth or WiFi communication as explained above. Signals indicated with dashed lines in the signaling diagrams are not necessarily, but in examples may be, transmitted on the radio channel on which signals are accepted and transmitted, in particular reflected, by the RRD 403.

Optionally, the first CN 401 may provide, to the second CN 402 a message 412 indicative of the capability of the first CN 401 to control the RRD 403 being re-configurable to provide multiple spatial polarization filters. The message 412 may also be indicative of the RRD 403 and/or the first CN 401 being able to implement at least one of the cases A to F mentioned above.

The first CN 401 may provide, to the RRD 403, a control message 421 indicative of predefined measurement spatial polarization filters. The control message 421 may be indicative of two different types of predefined measurement spatial polarization filters $$\left(e.g.,\ \begin{bmatrix} 1 & 0 \\ 0 & 1 \end{bmatrix}, \begin{bmatrix} 0 & 1 \\ 1 & 0 \end{bmatrix} \text{ or}\right.$$

$$\begin{bmatrix} 1 & 0 \\ 0 & 0 \end{bmatrix}, \begin{bmatrix} 0 & 0 \\ 0 & 1 \end{bmatrix}$$

as explained with respect to n=4 measurements for cases A and B above), three different type of predefined measurement spatial polarization filters $$\left(e.g.,\ \begin{bmatrix} 1 & 0 \\ 0 & 0 \end{bmatrix}, \begin{bmatrix} 0 & 0 \\ 1 & 0 \end{bmatrix}, \begin{bmatrix} 0 & 1 \\ 0 & 0 \end{bmatrix}\right)$$

as explained with respect to n=5 measurements above) or more than three different types of predefined measurement spatial polarization filters.

Further, the first CN 401 may provide, to the second CN 402, a message 413 requesting the second CN 402 to transmit first reference signals 430, 432, 434, 436, 438 associated with the predefined measurement spatial polarization filters. The message 413 may be provided after the control message 421. However, it is also conceivable that message 413 is provided before the control message 421.

The message 413 may comprise an indication of a number and/or type of first reference signals to be transmitted by the second CN 402. The number of first reference signals may correspond to the number of measurements n=4, n=5 or n=8 as explained above. Using a multiple of n=4, n=5 or n=8 may allow reducing the influence of noise on the channel estimations. The number of first reference signals to be transmitted may also be derived from the message 412, which may indicate which of the cases A to F is to be used.

The second CN 402 may transmit the first reference signals 430, 432, 434, 436, 438 on the radio channel and the first CN 401 may receive the first reference signals 431, 433, 435, 437, 439 via the RRD 403. The different reference signs for the first reference signals 430, 432, 434, 436, 438 and 431, 433, 435, 436, 437, 439 may be indicative of the spatial polarization filtering performed by the RRD 403. For example, the polarization of the signal 430 may be different after the signal 430 has been reflected by the RRD and is received as a signal 431 by the first CN 401.

Based on a receive property of the first reference signals 431, 433, 435, 437, 439, the first CN 401 may estimate a channel matrix $H_2$ of a radio channel between RRD 403 and the first CN 401. Alternatively or in addition, the first CN 401 may estimate a channel matrix $H_1$ of a radio channel between the second CN 402 and the RRD 403 based on a receive property of the first reference signals 431, 433, 435, 437, 439.

The first CN 401 may derive a spatial polarization filter from at least one of the estimated channel matrices $H_1$ and $H_2$. The spatial polarization filter may correspond to an optimized Q as explained above.

A message 422 indicative of the spatial polarization filter may be provided, by the first CN 401 to the RRD 403.

Afterwards, data communication 450 from the CN 402 to the first CN 401 (and in case of beam reciprocity from the first CN 401 to the second CN 402) may be performed taking advantage of a higher channel capacity due to the spatial polarization filter applied by the RRD 403.

Figure 5:
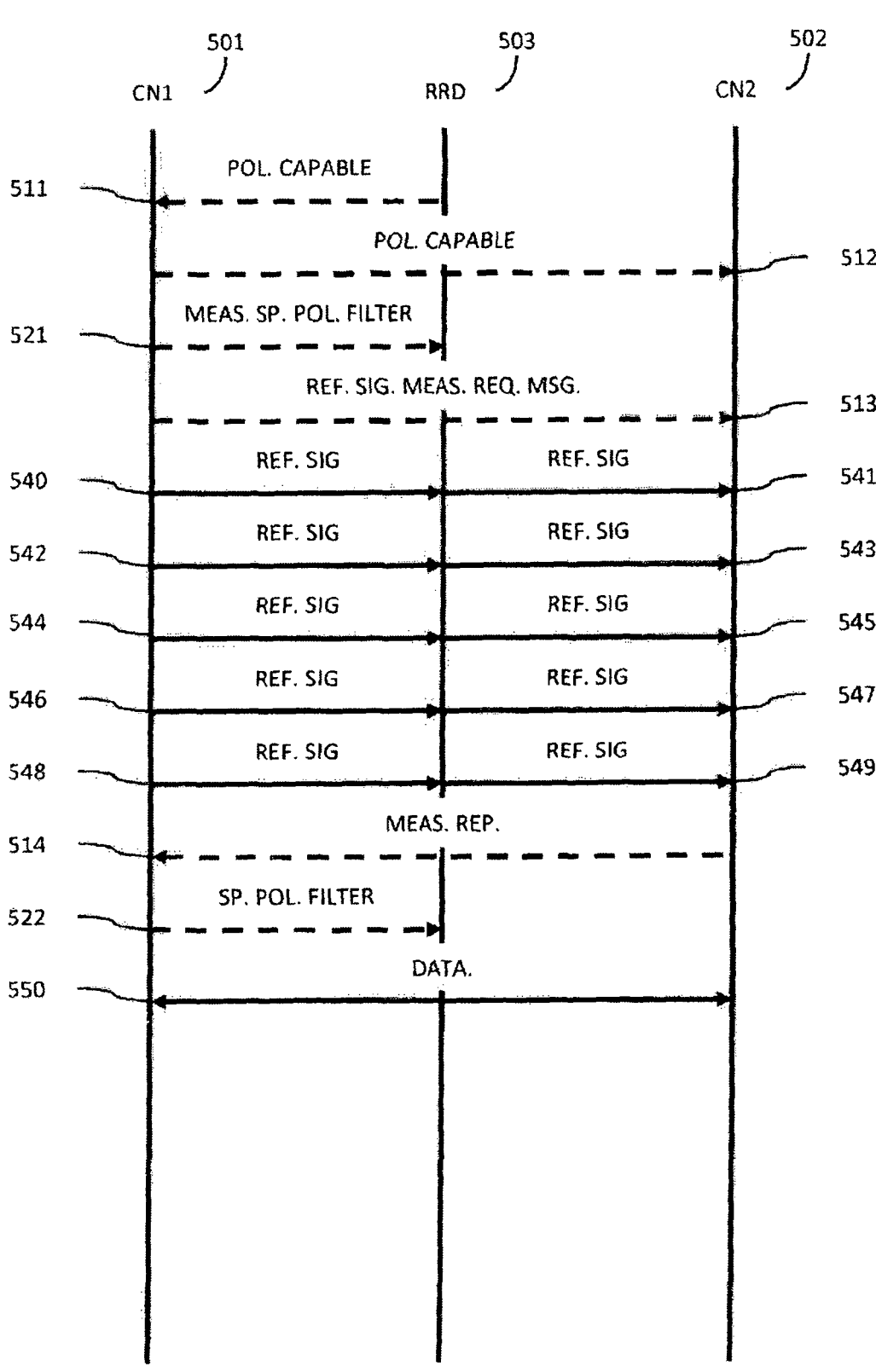
FIG. 5 is a signalling diagram.

FIG. 5 shows another signaling diagram illustrating signals exchanged between the first CN 501, the second CN 502 and the RRD 503. In contrast to the scenario of FIG. 4, in the scenario of FIG. 5, it is the first CN, i.e. the CN controlling the RRD, which transmits the reference signals for estimating the channel matrices and not the second CN.

The RRD 503 may be a re-configurable reflective device. The RRD 503 may be re-configurable to provide spatial polarization filtering, the spatial polarization filtering being associated with an input spatial direction from which incident signals on a radio channel are accepted and with an output spatial direction into which the incident signals are transmitted, in particular reflected, by the RRD with configurable output polarizations set by the spatial polarization filtering.

The RRD 503 may provide, to a first CN 501, a message 511 indicative of the RRD being re-configurable to provide multiple spatial polarization filters. The message 511 is not necessarily transmitted on the radio channel on which signals are accepted and transmitted, in particular reflected, by the RRD 503. Instead, the message 511 may be transmitted on a positioning radio channel as explained above. Signals indicated with dashed lines in the signaling diagrams are not necessarily transmitted on the radio channel on which signals are accepted and transmitted, in particular reflected, by the RRD 503.

Optionally, the first CN 501 may provide, to the second CN 502 a message 512 indicative of the capability of the first CN 501 to control the RRD 503 being re-configurable to provide multiple spatial polarization filters. The message 412 may also be indicative of the RRD 503 and/or the first CN 501 being able to implement at least one of the cases A to F mentioned above.

The first CN 501 may provide, to the RRD 503, a control message 521 indicative of predefined measurement spatial polarization filters. The control message 521 may be indicative of two different types of predefined measurement spatial polarization filters $$\left(e.g., \begin{bmatrix} 1 & 0 \\ 0 & 1 \end{bmatrix}, \begin{bmatrix} 0 & 1 \\ 1 & 0 \end{bmatrix} \text{ or} \right.$$

$$\left. \begin{bmatrix} 1 & 0 \\ 0 & 0 \end{bmatrix}, \begin{bmatrix} 0 & 0 \\ 0 & 1 \end{bmatrix} \right]$$

as explained with respect to n=4 measurements for cases A and B above), three different type of predefined measurement spatial polarization filters $$\left(e.g., \begin{bmatrix} 1 & 0 \\ 0 & 0 \end{bmatrix}, \begin{bmatrix} 0 & 0 \\ 1 & 0 \end{bmatrix}, \begin{bmatrix} 0 & 1 \\ 0 & 0 \end{bmatrix} \right]$$

as explained with respect to n=5 measurements above) or more than three different types of predefined measurement spatial polarization filters.

Further, the first CN 501 may provide, to the second CN 502, a reference signal measurement request message 513 requesting the second CN 502 to receive second reference signals 531, 533, 535, 537, 539. The message 513 may be provided after the control message 521. However, it is also conceivable that the message 513 is provided before the control message 521.

The message 513 may comprise an indication of a number second reference signals 531, 533, 535, 537, 539 to be received by the second CN 502. The number of second reference signals may correspond to the number of measurements n=4, n=5 or n=8 as explained above. Using a multiple of n=4, n=5 or n=8 may allow reducing the influence of noise on the channel estimations. The number of first reference signals to be transmitted may also be derived from the message 412, which may indicate which of the cases A to F is to be used.

The first CN 501 may transmit the second reference signals 530, 532, 534, 536, 538 on the radio channel and the second CN 502 may receive the second reference signals 531, 533, 535, 537, 539 via the RRD 503. The different reference signs for the first reference signals 530, 532, 534, 536, 538 and 531, 533, 535, 536, 537, 539 may be indicative of the spatial polarization filtering performed by the RRD 503.

The first CN 501 may obtain, from the second CN 502, a measurement report 514 indicative of a receive property of the second reference signals 541, 543, 545, 547, 549.

Based on the receive property of the second reference signals 531, 533, 535, 537, 539, the first CN 501 may estimate a channel matrix $H_2$ of a radio channel between RRD 503 and the first CN 501. Alternatively, or in addition, the first CN 501 may estimate a channel matrix $H_1$ of a radio channel between the second CN 502 and the RRD 503 based on a receive property of the second reference signals 531, 533, 535, 537, 539.

The first CN 501 may derive a spatial polarization filter from at least one of the estimated channel matrices $H_1$ and $H_2$. The spatial polarization filter may correspond to an optimized Q as explained above. It is also conceivable that the second CN 502 estimates one or both of the channel matrices $H_1$ and $H_2$ based on the receive property of the second reference signals 531, 533, 535, 537, 539 and, optionally, derives the spatial polarization filter from one of the estimated channel matrices $H_1$ and $H_2$. Accordingly, the measurement report 514 may also comprise at least one of the estimated channel matrices $H_1$ and $H_2$ or the spatial polarization filter.

A message 522 indicative of the spatial polarization filter may be provided, by the first CN 501 to the RRD 503.

Afterwards, data communication 550 from the CN 502 to the first CN 501 (and in case of beam reciprocity from the first CN 501 to the second CN 502) may be performed taking advantage of a higher channel capacity due to the spatial polarization filter applied by the RRD 503.

Figure 6:
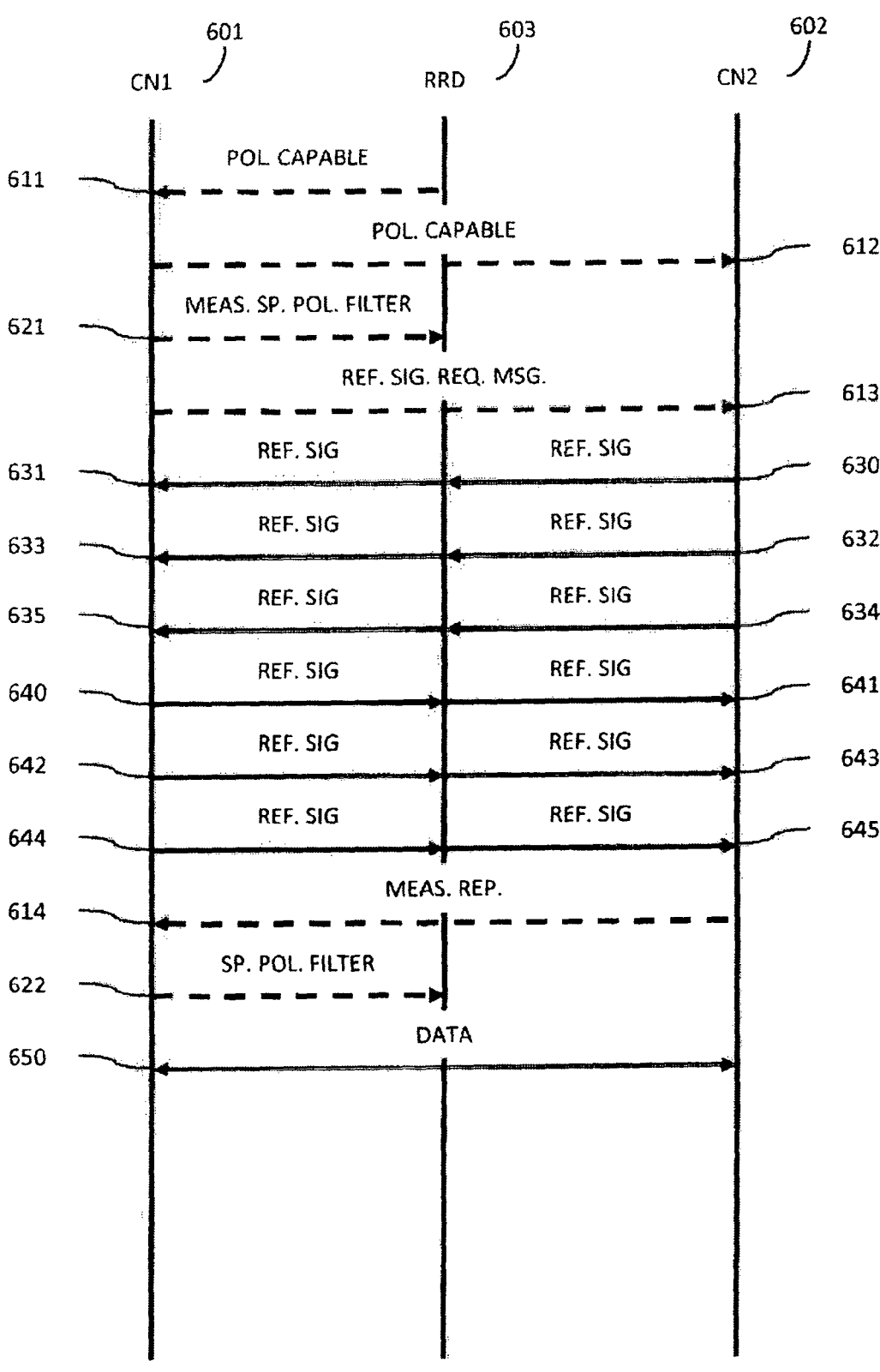
FIG. 6 is a signalling diagram.

FIG. 6 is a further signaling diagram illustrating signals exchanged between a first CN 601, a second CN 602 and an RRD 603. The scenario of FIG. 6 combines aspects from the scenarios of FIGS. 4 and 5. In particular, signals 611, 612, 621, 613, 614, 622, 650 correspond to signals 411 (or 511), 412 (or 512), 421 (521), 413, 514, 422 (or 522), 650. According to FIG. 6, a combination of first reference signals 630-635 and second reference signals 640-645 may be used for estimating the channel matrices $H_1$ and $H_2$. The signal 613 may also include an indication that the second CN 602 is to receive the second reference signals 641, 643, 645. It may be possible that the first CN estimates the channel matrix $H_2$ and the second CN estimates the channel matrix matrices $H_1$ or vice versa. Thus, the effort for determining a spatial polarization filter may be shared by the first CN 601 and the second CN 602.

Summarizing, it is proposed a communication system in which an RRD may be configured to perform RRD actions (predefined polarization manipulation states, e.g. parallel or anti-parallel) that may be associated with the transmission of reference signals (or sounding signals) within an identified beam-pair. The RRD-actions may be added to the directive precoder, i.e. the precoder used for adapting the input and output direction of the RRD to the first CN and the second CN. The proposed signaling covers both UL and DL based cases.

Although the disclosure has been shown and described with respect to certain preferred examples, equivalents and modifications will occur to others skilled in the art upon the reading and understanding of the specification. The present disclosure includes all such equivalents and modifications and is limited only by the scope of the appended claims.

For illustration, while various scenarios have been illustrated in the context of a DL transmission from a second CN 102 to a first CN 101 using the RRD 103, similar techniques can be applied for, e.g., transmissions between two mobile devices, e.g., to UEs on a sidelink or generally using device-to-device (D2D) communication. For further illustration, well above various scenarios have been described with an implementation of the RRD using an antenna array, similar techniques may be readily applied to other kinds and types of surfaces having a re-configurable refractive index.

Where the European patent application contains drawings including reference signs, the technical features specified in the claims shall preferably be followed by such reference signs relating to these features, placed in parentheses, if the intelligibility of the claim can thereby be increased. These reference signs shall not be construed as limiting the claim.

The invention claimed is:

1. A method of operating a first communication node (CN), wherein the first CN is configured for controlling a re-configurable relaying device (RRD), in particular a re-configurable reflective device, the RRD-being re-configurable to provide spatial polarization filtering, the spatial polarization filtering being associated with an input spatial direction from which incident signals on a radio channel are accepted and with an output spatial direction into which the incident signals are transmitted, in particular reflected, by the RRD with configurable output polarizations set by the spatial polarization filtering, the method comprising providing, to the RRD, a control message indicative of predefined spatial polarization filters;

providing, to a second CN, a message requesting the second CN to transmit first reference signals associated with the predefined spatial polarization filters, and receiving, on the radio channel from the second CN, first reference signals associated with the predefined spatial polarization filters indicated by said control message, for estimation of channel matrices $H_1$, $H_2$).

2. The method of operating the first CN according to claim 1, the method further comprising providing, to the RRD, based on a receive property of the first reference signals from the second CN, a message indicative of a spatial polarization filter.

3. The method of operating the first CN of claim 1, wherein the control message is indicative of two different types of predefined spatial polarization filters, three different types of predefined spatial polarization filters or more than three different types of predefined spatial polarization filters.

4. The method of operating the first CN of claim 1, the method further comprising providing, to the second CN, a message indicative of the capability of the first CN to control the RRD being re-configurable to provide multiple spatial polarization filters.

5. The method of operating the first CN of claim 1, wherein the message requesting the second CN to transmit the first reference signals comprises an indication of a number and/or type of first reference signals to be transmitted by the second CN.

6. The method of operating the first CN of claim 5, wherein the number of first reference signals to be transmitted by the second CN is four, five, eight, or greater than eight, in particular a multiple of four, five or eight.

7. The method of operating the first CN of claim 1, further comprising at least one of estimating, by the first CN, a channel matrix $H_2$) of a radio channel between the RRD and the first CN based on a receive property of the first reference signals from the second CN;

estimating, by the first CN, a channel matrix $H_1$) of a radio channel between the second CN and the RRD based on a receive property of the first reference signals from the second CN.

8. The method of operating the first CN of claim 7, the method further comprising transmitting, on the radio channel to the second CN, second reference signals, and optionally, obtaining, from the second CN, a channel matrix message indicative of an estimated channel matrix of the radio channel between the second CN and the RRD.

9. The method of operating a first CN of claim 7, deriving a or the spatial polarization filter from the estimated channel matrix $H_2$) of the radio channel between the RRD and the first CN and/or from the estimated channel matrix $H_1$) of the radio channel between the second CN and the RRD.

10. A method of operating a first communication node (CN), wherein the first CN is configured for controlling a re-configurable relaying device (RRD), in particular a re-configurable reflective device, the RRD-being re-configurable to provide spatial polarization filtering, the spatial polarization filtering being associated with an input spatial direction from which incident signals on a radio channel are accepted and with an output spatial direction into which the incident signals are transmitted, in particular reflected, by the RRD with configurable output polarizations set by the spatial polarization filtering, the method comprising providing, to the RRD, a polarization measurement control message indicative of predefined spatial polarization filters;

providing, to a second CN, a reference signal measurement request message requesting the second CN to receive second reference signals for estimation of channel matrices $H_1$, $H_2$);

transmitting, on the radio channel to the second CN, second reference signals associated with the predefined spatial polarization filters, and obtaining, from the second CN, a measurement report indicative of a receive property of the second reference signals.

11. The method of operating the first CN according to claim 10, the method further comprising, providing, to the RRD, based on the receive property of the second reference signals, a message indicative of a spatial polarization filter.

12. The method of operating the first CN according to claim 10, wherein the control message is indicative of two different types of predefined spatial polarization filters, three different types of spatial polarization filters or more than three different types of spatial polarization filters.

13. The method of operating the first CN of claim 10, the method further comprising providing, to the second CN, a message indicative of the capability of the first CN to control the RRD being re-configurable to provide multiple spatial polarization filters.

14. The method of operating the first CN of claim 10, wherein the reference signal measurement request message comprises an indication of a number of second reference signals to be received by the second CN.

15. The method of operating the first CN of claim 14, wherein the number of second reference signals is four, five, eight or greater than eight, in particular a multiple of four, five or eight.

16. The method of operating the first CN of claim 10, further comprising at least one of estimating, by the first CN, a channel matrix $H_2$) of a radio channel between the first CN and the RRD based on a receive property of the second reference signals;

estimating, by the first CN, a channel matrix $H_1$) of a radio channel between the RRD and the second CN based on a receive property of the second reference signals.

17. The method of operating the first CN of claim 16, deriving a spatial polarization filter from the estimated channel matrix $H_2$) of the radio channel between the first CN and the RRD and/or the estimated channel matrix $H_1$) of the radio channel between the RRD and the second CN.

18. A method of operating a second communication node (CN), the method comprising obtaining, from a first CN, a message indicative of the capability of the first CN to control a re-configurable relaying device (RRD), in particular a re-configurable reflective device, the RRD being re-configurable to provide spatial polarization filtering, the spatial polarization filtering being associated with an input spatial direction from which incident signals with input polarizations on a radio channel are accepted and with an output spatial direction into which the incident signals are transmitted, in particular reflected, by the RRD with configurable output polarizations set by the spatial polarization filtering, obtaining, from the first CN, a message requesting the second CN to transmit first reference signals for estimation of channel matrices $H_1$, $H_2$), and transmitting, on the radio channel to the first CN, the first reference signals.

19. The method of operating the second CN of claim 18, wherein the message requesting the second CN to transmit the first reference signals comprises an indication of a number and/or type of first reference signals to be transmitted by the second CN.

20. The method of operating a second CN of claim 19, wherein the number of first reference signals to be transmitted by the second CN is four, five, eight, or greater than eight, in particular a multiple of four, five or eight.

* * * * *